June 28, 1955
L. M. KING
2,712,054
ELECTRIC STEAM HEATER
Filed Aug. 25, 1953
3 Sheets-Sheet 1
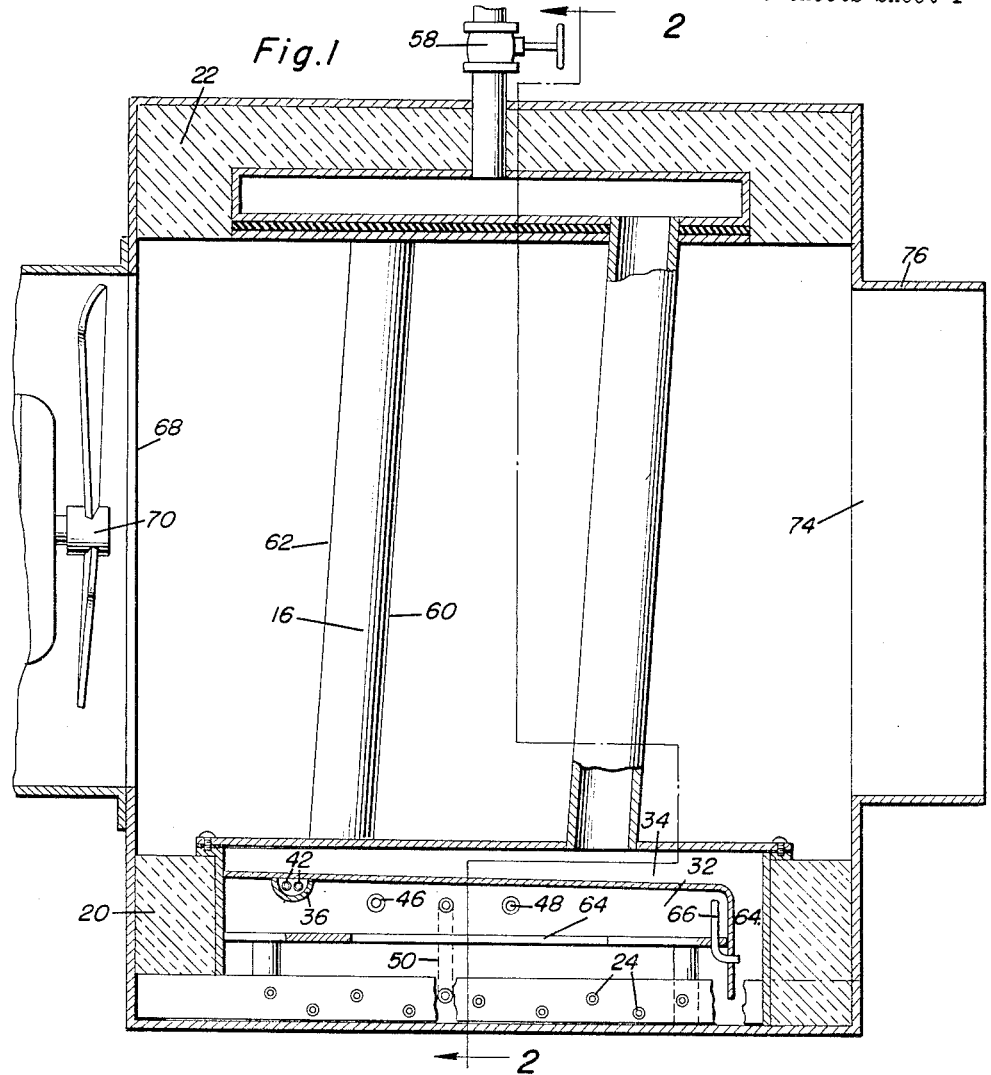
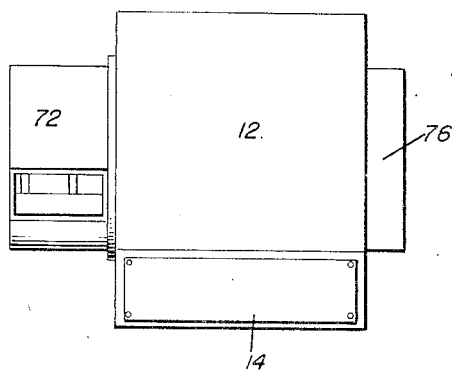
Lester M. King
INVENTOR.
BY *Clarence A. O'Brien*
and *Harvey B. Jacobson*
Attorneys June 28, 1955 L. M. KING 2,712,054
ELECTRIC STEAM HEATER
Filed Aug. 25, 1953 3 Sheets-Sheet 2
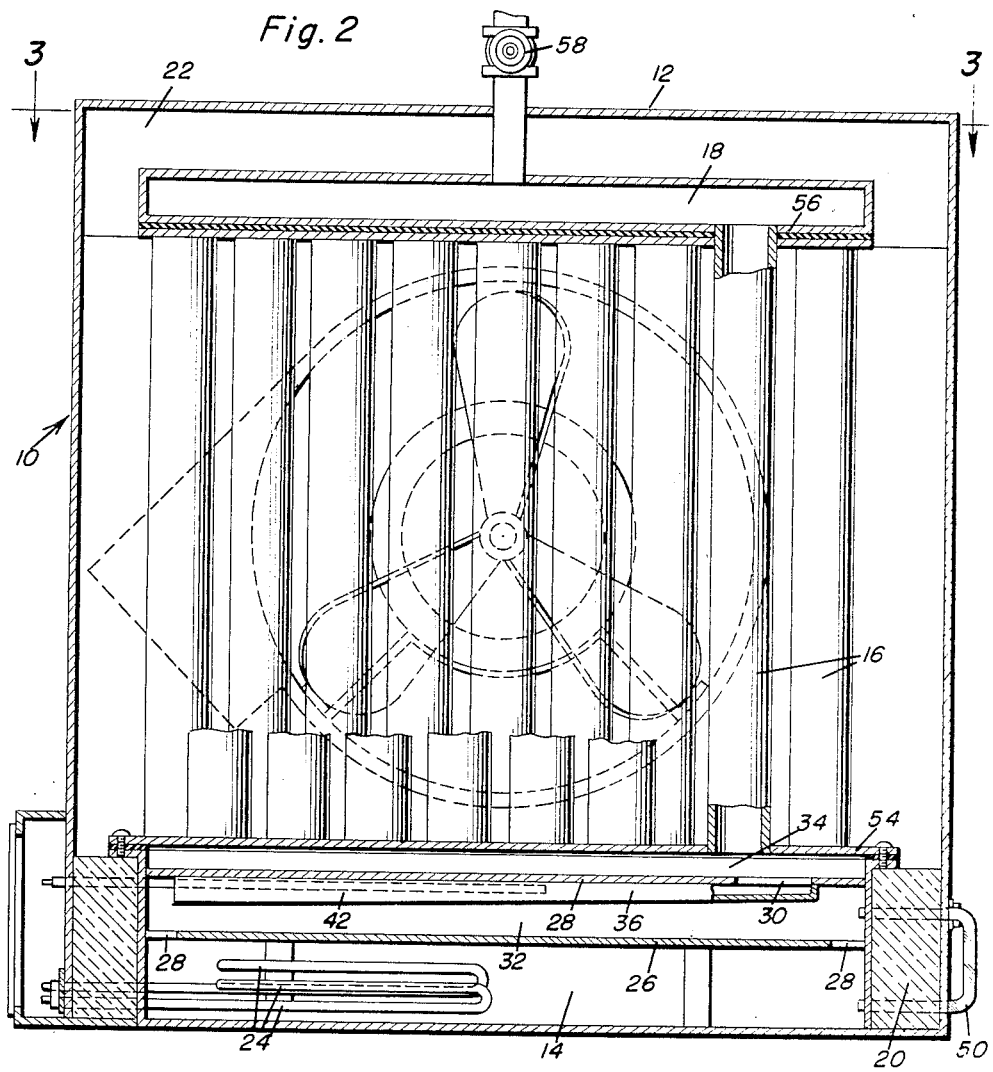
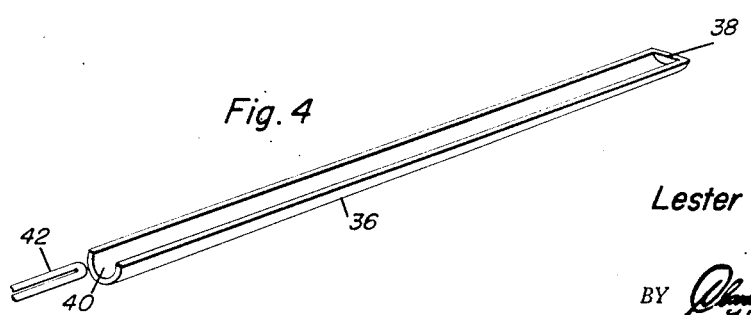
Lester M. King
INVENTOR.

June 28, 1955  L. M. KING  2,712,054
ELECTRIC STEAM HEATER
Filed Aug. 25, 1953  3 Sheets-Sheet 3

Lester M. King
INVENTOR.

BY *Clarence A. O'Brien*
*and Harvey B. Jacobson*
Attorneys 2,712,054

ELECTRIC STEAM HEATER

Lester M. King, Oakridge, Oreg.

Application August 25, 1953, Serial No. 376,353

6 Claims. (Cl. 219—39)

This invention relates to an electric steam heater, and more particularly to a device which may be readily carried from one location to another and which will require no combustible fuel, but may be readily used wherever there is a suitable supply of electrical power.

An object of the present invention resides in the provision of an electric steam heater that is capable of providing a considerable amount of hot air, heat which may be readily incorporated with the air ducts of a conventional hot air heating system, and which may alternatively be used for any other heating purposes as may be desired.

The construction of this invention features novel upwardly slantingly extending heat exchange tubes which are adapted to concurrently perform the functions of heat exchange pipes in which hot steam is carried upwardly into a header, the heat exchange pipes being further adapted to carry the condensate down back into the boiler.

A novel arrangement incorporated in this invention resides in the manner of super-heating saturated steam so as to enable the device to perform more efficiently. A suitable conduit is appended to a plate having an aperture therethrough, and the saturated steam travels past a heating unit mounted in the conduit.

Still further objects and features of this invention reside in the provision of an electric steam heater that is strong and durable, simple in construction and manufacture, of comparatively small size, which may be readily suspended from a ceiling or set on any suitable base in any desired building, and which may utilize the hot air ducts of a conventional heating system in transferring the heat produced thereby to various other portions of a building.

These, together with the various ancillary objects and features of the invention which will become apparent as the following description proceeds, are attained by this hot air electric steam heating device, a preferred embodiment of which has been illustrated in the accompanying drawings, by way of example only, wherein:

Figure 1 is a vertical sectional view of the electric steam heater comprising the present invention and illustrating the manner in which the heat transfer tubes extend slantingly upwardly;

Figure 2 is a vertical sectional detail view as taken along the plane of line 2—2 in Figure 1, illustrating the staggered arrangement of the heat exchange tubes and the construction of the super-heating arrangement;

Figure 4 is a perspective view illustrating the construction of the conduit forming a portion of the super-heat arrangement;

Figure 5:
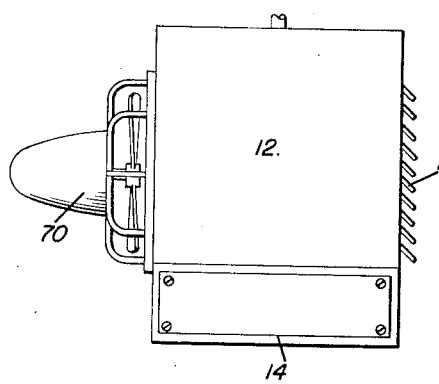

Figure 5 is a side elevational view of one form of the invention incorporating the elements thereof as positioned within the casing and using a blower and a louvered outlet arrangement for distributing heat within a room of a building; and Figure 6 is a side elevational view of an alternative arrangement of parts whereby a centrifugal type blower is utilized and in which the outlet from the heater is connected to a duct work whereby the device may be incorporated with various existing air ducts.

With continuing reference to the accompanying drawings wherein like reference numerals designate similar parts throughout the various views, reference numeral 10 generally designates the electric steam heater comprising the present invention which includes the casing 12 within which a boiler 14, heat transfer tubes 16, and a header 18 and the appurtenances relating thereto.

The boiler 14 is suitably insulated, as at 20, from the sides of the casing 12, and the header 18 is likewise insulated, as at 22. The boiler 14 includes a plurality of electrical heating elements 24 of an immersion type, such as the "Calrod" type heating unit. Within the boiler 14, there is situated a baffle plate 26 having passageways 28 therethrough. The baffle plate 26 is provided so as to prevent the water contained within the boiler 14 from rolling. There is also positioned within the boiler 14 a plate 28 having an aperture 30 therethrough. The plate 28 divides the portion of the boiler 14 above the baffle 26 into a saturated steam chamber 32 and a super-heated steam chamber 34. There is provided a substantially semi-cylindrical tapered conduit of the shape as can be best seen in Figure 4 and generally indicated by reference numeral 36 which is attached to the plate 28 and overlies the entire aperture 30. The conduit 36 is sealed at its end 38 and is only open at the end 40 thereof, whereby steam passing upwardly must traverse the entire length of conduit 36. There is received within the conduit 36 a suitable heating element 42 or super-heating unit which is designed to additively heat the saturated steam generated by the heating elements 24. There is provided a safety valve 46 preventing excess build-up of pressure, as well as a pressure gauge 48 of conventional construction. A water glass 50 is also mounted externally of the casing to thereby permit the level of the water contained within the boiler to be readily determined. A suitable immersion thermostatic bulb 52 is provided for controlling the temperature of the super-heated steam. This thermostatic bulb or switch has an external dial or control whereby the temperature of the super-heated steam can be set at any desired point so that the over-all output of this unit can be readily reset.

The heat transfer pipes 16 are fitted into the upper plate 54 of the boiler 14 and into the bulb portions 56 of the header 18. There is provided a valve 58 for bleeding air from this entire closed system, preferably of a globe valve construction. The valve 58 extends out of the casing 12. It is noted that any condensate draining from the header 18 will drain down the lower sloping portions, as at 60, of the heat transfer tubes 16 whereas the steam will move upwardly along the upper slanted portions 62 of these tubes. Thus, the flow back and forth of the condensate and the steam will not obstruct each other. The downwardly falling condensate will, of course, pass through the side openings 64 in the plate 28 and downwardly past the baffle plate where it may pass into the boiler 14. There is provided a tube 66 connecting the saturated steam chamber 32 with the super-heated steam chamber 34 whereby drier steam than the condensate passing downwardly through the passages 66 will rise back into the saturated steam chamber so as to give added efficiency to the entire apparatus.

Positioned in alignment with an inlet opening 68 in the casing 12 is a blower or fan 70 which may be of the impeller type, as is illustrated in Figures 1 and 5, or which, alternatively, may be a centrifugal blower, as is shown in Figure 6. The outlet opening 74 of the casing 12 has alternatively duct work 76 attached thereto for connecting the device to an existing arrangement of ducts of a hot air heating system. Alternatively, as is shown in Figure 5, the outlet 74 may be provided with louvers 78 for controlling the flow of hot air in a room of a building being heated.

Figure 3:
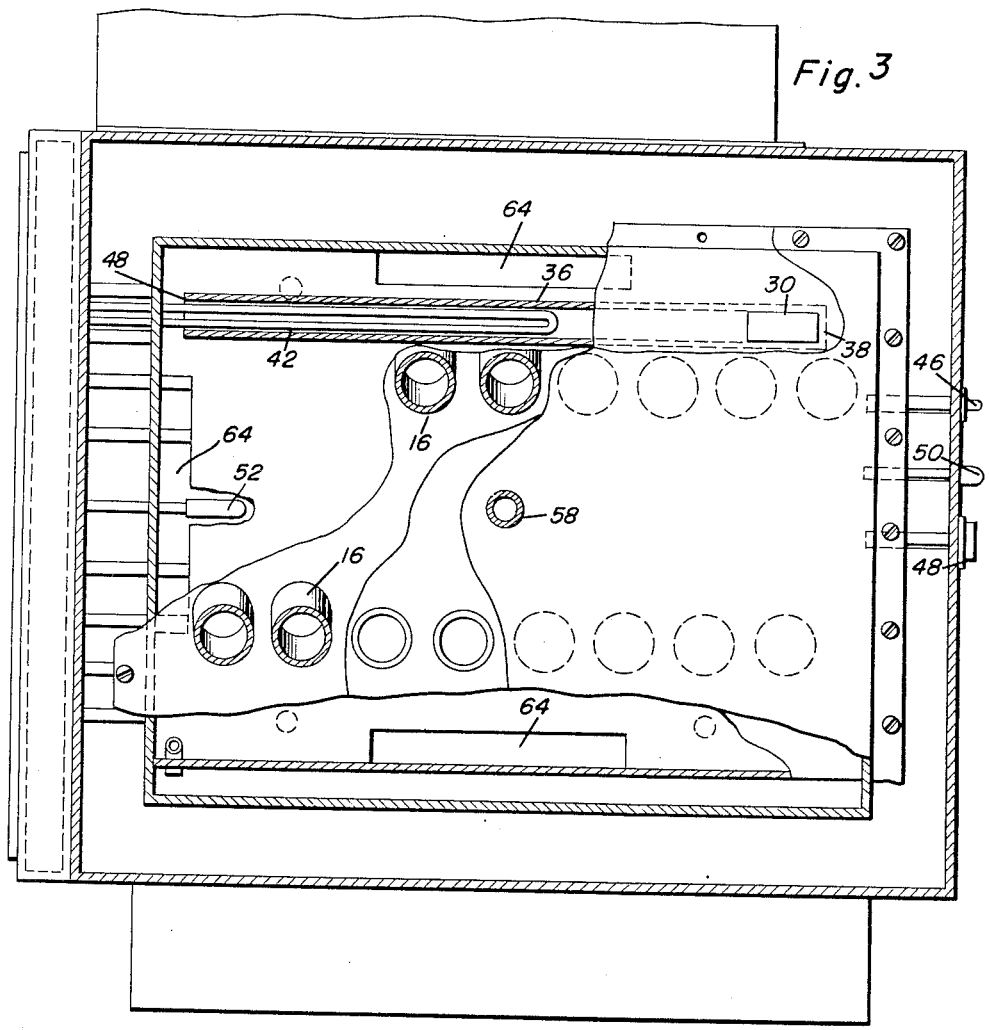
Figure 3 is a horizontal sectional view as taken along the plane of line 3—3 in Figure 2, with parts thereof being broken away to show other parts in detail.

In operation, the fan 70 or blower 72 will cause a stream of air to impinge against the suitably staggered heat exchange tubes 16 which can be best observed in Figures 2 and 3. It is to be noted that these tubes are upwardly slanting away from the fan or blower, to thereby provide a forward surface 62 which will be heated by the rising steam, the lower surface 60 providing a path for the condensate. Thus, the heated air will first impinge against the hottest portions of the heat exchange tubes 16 thereby adding to the efficiency of the entire arrangement. The air heated by intimate engagement with the heat exchange tubes 16 will pass out of the outlet 74 through alternatively the louvers 78 or the ducts 76. Inasmuch as the entire device is a sealed system, the globe valve 58 is provided for bleeding the air from the system when such is first being placed in use. Further, it is to be noted that the boiler 14 and the associated plates are suitably reinforced against buckling due to the differential pressures introduced during the operation of the device.

Since from the foregoing, the construction and advantages of this electric steam heater are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

1. An electric steam heater comprising a casing, an inlet air duct for said casing, an outlet in said casing, a boiler in said casing, a plurality of upwardly slantingly extending heat exchange tubes connected to said boiler, a condensate header at the tops of all of said tubes, and a blower arranged to blow air from said inlet duct past said tubes and through said outlet, all of said tubes extending upwardly away from said blower.

2. An electric steam heater comprising a casing, an inlet air duct for said casing, an outlet in said casing, a boiler in said casing, a plurality of upwardly slantingly extending heat exchange tubes connected to said boiler, a condensate header at the top of said tubes, and a blower arranged to blow air from said inlet duct past said tubes and through said outlet, said tubes extending upwardly away from said blower, said tubes being arranged in rows with the tubes of one row being arranged in staggered relationship relative to the tubes of the next adjacent row.

3. An electric steam heater comprising a boiler, a plurality of upwardly slantingly extending heat exchange tubes connected to said boiler, a condensate header at the tops of all of said tubes, and a blower for directing air past said tubes, said boiler including immersion heating elements, a baffle positioned above said heating elements, and a plate positioned above said baffle dividing the portion of said boiler above said baffle into a saturated steam chamber and a super-heated steam chamber, an aperture through said plate, a conduit covering said aperture, said conduit opening into said saturated steam chamber below said plate, and a heating unit in said conduit.

4. An electric steam heater comprising a boiler, a plurality of upwardly slantingly extending heat exchange tubes connected to said boiler, a condensate header at the tops of all of said tubes, and a blower for directing air past said tubes, said boiler including immersion heating elements, a baffle positioned above said heating elements, and a plate positioned above said baffle dividing the portion of said boiler above said baffle into a saturated steam chamber and a super-heated steam chamber, an aperture through said plate, a conduit covering said aperture, said conduit opening into said saturated steam chamber below said plate, and a heating unit in said conduit, said conduit having a bottom slanting downwardly away from said aperture.

5. An electric steam heater comprising a casing, an inlet air duct for said casing, an outlet in said casing, a boiler in said casing, a plurality of upwardly slantingly extending heat exchange tubes connected to said boiler, a condensate header at the tops of all of said tubes, and a blower arranged to blow air from said inlet duct past said tubes and through said outlet, said boiler including immersion heating elements, a baffle positioned above said heating elements, and a plate positioned above said baffle dividing the portion of said boiler above said baffle into a saturated steam chamber and a super-heated steam chamber, an aperture through said plate, a conduit covering said aperture, said conduit opening into said saturated steam chamber below said plate, and a heating unit in said conduit.

6. An electric steam heater comprising a casing, an inlet air duct for said casing, an outlet in said casing, a boiler in said casing, a plurality of upwardly slantingly extending heat exchange tubes connected to said boiler, a condensate header at the tops of all of said tubes, and a blower arranged to blow air from said inlet duct past said tubes and through said outlet, said boiler including immersion heating elements, a baffle positioned above said heating elements, and a plate positioned above said baffle dividing the portion of said boiler above said baffle into a saturated steam chamber and a super-heated steam chamber, an aperture through said plate, a conduit covering said aperture, said conduit opening into said saturated steam chamber below said plate, and a heating unit in said conduit, all of said tubes extending upwardly away from said blower, said tubes being arranged in rows with the tubes of one row being arranged in staggered relationship relative to the tubes of the next adjacent row.

References Cited in the file of this patent

UNITED STATES PATENTS

| 1,141,888 | Schmidt | June 1, 1915 |
| 1,437,420 | Hill | Dec. 5, 1922 |
| 1,828,294 | Provencal | Oct. 20, 1931 |
| 2,290,402 | Witte, Jr. | July 21, 1942 |
| 2,481,963 | Witte et al. | Sept. 13, 1949 |

OTHER REFERENCES

"Electric Home Heating Plant," Product Eng'g., May 1947, Library (pages 96–97).